Nov. 17, 1936.   W. C. LENT   2,061,382
METHOD AND APPARATUS FOR VOLTAGE MEASUREMENT
Filed Oct. 26, 1933   2 Sheets-Sheet 1

INVENTOR
Worthington C. Lent
BY
ATTORNEY

Nov. 17, 1936.  W. C. LENT  2,061,382
METHOD AND APPARATUS FOR VOLTAGE MEASUREMENT
Filed Oct. 26, 1933  2 Sheets-Sheet 2

INVENTOR
Worthington C. Lent.
BY
H. R. Van Deventer
ATTORNEY

Patented Nov. 17, 1936

2,061,382

UNITED STATES PATENT OFFICE 2,061,382

METHOD AND APPARATUS FOR VOLTAGE MEASUREMENT

Worthington C. Lent, Ridgefield Park, N. J., assignor to General Communications Laboratories, Inc., a corporation of New Jersey Application October 26, 1933, Serial No. 695,253

5 Claims. (Cl. 179—171)

This invention relates to a method and apparatus for voltage measurements and has for an object the accurate measurement of the ratio of two voltages, utilizing apparatus which is simple and cheap to construct.

Another object is to provide a method and apparatus for measuring peak voltages such as occur in connection with the modulation of carrier waves as used in radio telephony and the like, and where it is desired to determine by voltage measurements the amplitude variation in the modulated carrier wave.

A further object is to provide apparatus to be used in voltage and other measurements that is readily portable, particularly in respect to the meter employed, said meter being direct reading and combined in a single carrying case with auxiliary equipment used therewith.

Other objects will more fully hereinafter appear, the invention consisting not only in the method described, but also in the construction, combination, location and relative arrangement of the instrumentalities in the circuit herein disclosed, all as more fully hereinafter set forth, as shown by the accompanying drawings and as finally pointed out in the appended claims.

While this method may be used for a large variety of measurements, by way of illustration it will be described as applied to the measurement of a modulated carrier wave as commonly used in radio broadcasting.

Radio broadcasting in its present form depends upon the generation and modulation of a so-called "carrier wave" that is, a radio frequency oscillatory current which is varied in frequency, phase or amplitude in conformity with the variations of the material to be transmitted. The process of modulation by amplitude variation has come to be accepted as the most suitable and is universally used.

Since the intelligence is transmitted by the variation of the carrier amplitude and not the amplitude itself, the degree of that variation at a particular instant becomes the direct measure of the effectiveness of the transmission. In other words, no matter how strong the carrier wave of a station may be, if that carrier be not modulated no signal will be produced in the receiving loudspeaker. It naturally follows that every broadcaster, vitally interested commercially in rendering the maximum service to the listening public, is greatly concerned with the operating efficiency and hence the modulation degree of his transmitting equipment.

Methods for the determination of modulation performance have been known for a long time. Many of these are rather involved utilizing oscillographs and the like and are limited in application due to excessive cost or the special conditions necessary in order that they may be applied. It is therefore desirable that the operator of a broadcasting or other radio station have some simple, direct-reading and comparatively inexpensive methods and instruments available for the measurement of modulation degree under any operating condition, whether that be during special tests with constant tone or during program periods with complex modulating signals.

If a radio frequency carrier wave is amplitude modulated by a complex wave carrying intelligence to be transmitted, the direct measure of the degree of such modulation is the ratio of the increase (or decrease) in instantaneous amplitude of the carrier wave during modulation to the unmodulated steady-state amplitude of that carrier wave. In order to measure modulation degree, it is, then, necessary to measure both the steady-state amplitude and the increase (or decrease) in amplitude at a particular instant.

In the method herein described the foregoing measurements of the steady-state amplitude and the increase (or decrease) in amplitude at a particular instant are accomplished and the method will be understood by reference to the following specification and the accompanying drawings, in which.

It will be understood that only sufficient of the circuits are shown to enable the invention to be understood. For example, the tubes may be of the filamentary cathode type or of the heater type and such other modifications may be made in the various elements used as is customary in order to meet varying operating conditions.

Figure 1:
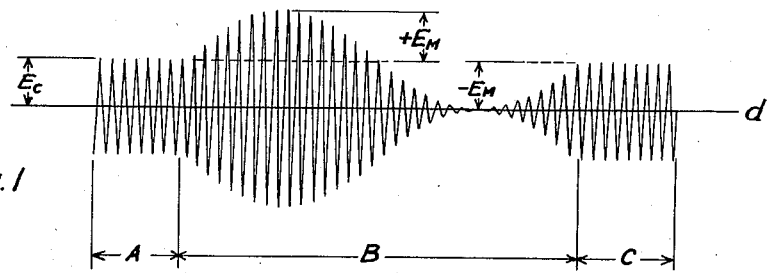
Figure 1 is a diagram of a modulated carrier wave where it is desired to measure $+E_m$ or $-E_m$ and $E_c$.

Referring to Figure 1, in the portion "A" the carrier wave has the amplitude $E_c$, which is the unmodulated or steady-state amplitude. Portion "B" shows the increase and decrease due to modulation, and in "C" the amplitude is returned to the steaty-state value once more. The modulation degree is defined as the ratio of $+E_m$ to $E_c$ or $-E_m$ to $E_c$.

In order to measure $+E_m$ or $-E_m$ and $E_c$, it is necessary that the envelope of the modulated wave shown be demodulated, that is, rectified, so as to eliminate one half of the envelope. The portion of the wave eliminated may be that below the horizontal line $d$, Figure 1. If this demodulation process were not used, the average instantaneous voltage of the envelope would be zero since both halves of the envelope are equal and opposite in phase. Eliminating the lower half of the envelope by demodulation permits the observation of the variations of the carrier amplitude during modulation.

The foregoing will be more apparent if the complete theoretical circuit used in carrying out this method of measurement be considered. Such a circuit is shown in Figure 2 and consists of an input or demodulator circuit, a rectifier and filter system connected thereto, and an analyzing circuit connected to the output common to both the circuits aforesaid.

Figure 2:
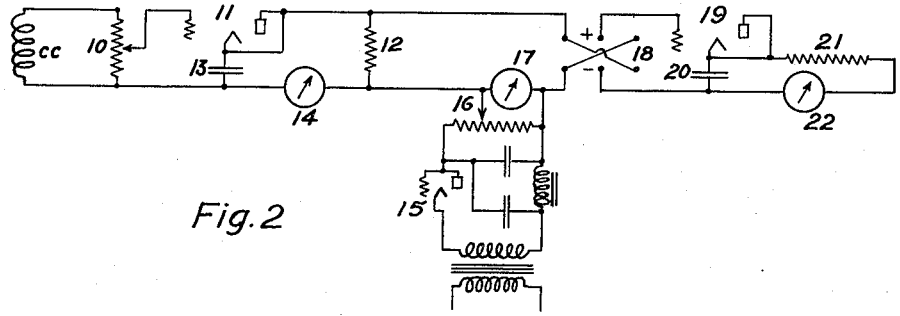
Figure 2 is a diagram of a preferred form of circuit and instrumentalities for carrying out the method constituting the invention as employed in making the measurements referred to in connection with Figure 1.

Referring to Figure 2, CC is an input coupling coil which is used to pick up energy from the source of modulated energy being measured. The numeral 10 denotes an input control potentiometer for the purpose of adjusting the input level to a predetermined value. The numeral 11 denotes an input rectifier or the equivalent electrically which, in conjunction with the resistor 12 and the radio frequency by-pass condenser 13, forms a linear demodulator. Strict linearity is essential to accuracy inasmuch as the true wave shape of the modulation envelope of the incoming energy must be maintained. An input meter 14 inserted in the demodulator circuit as shown, reads the average value of the rectified envelope current.

If the potentiometer 10 is adjusted until a known predetermined current is made to flow thru this circuit there will be established across resistor 12 a known voltage which is directly proportional to the average carrier amplitude voltage. If the modulation is symmetrical this voltage will have a constant average value although the instantaneous value will undergo the variations due to modulation. No direct current indicating instrument is capable of responding to these rapid instantaneous variations and hence the meter 14 will show a constant deflection.

In order to investigate the instantaneous variations across the resistor 12, some form of voltmeter is necessary. This voltmeter must be capable of reading both positive and negative variations. The steady-state rectified average carrier voltage established across resistor 12 would act as a steady bias on a voltmeter shunted across the resistor and hence a balancing voltage equal in magnitude and opposite in polarity must be introduced. This balancing voltage is obtained from the rectifier and filter system 15 which operates in the usual manner and the magnitude is adjusted by means of potentiometer 16. The magnitude of this balancing voltage is measured by means of the D. C. voltmeter 17. The voltage is adjusted to be equal to the average carrier voltage established across resistor 12.

From a study of Figure 2 it will be apparent that the analyzer circuit to the right of the reversing switch 18 has, in view of the foregoing, nothing impressed thereon but the modulation variations in the rectified envelope. The reversing switch 18 enables the voltmeter in the analyzing circuit to read either positive or negative variations at will. The analyzing circuit includes the rectifier tube 19, the condenser 20, and resistor 21 and the direct current microammeter 22. The action of the latter is as follows:

If a complex wave is introduced into the analyzing circuit via switch 18, the tube 19 rectifies the current and charges the condenser 20. This condenser has a value so large and the resistor 21 in series therewith a value so high, that the charge cannot leak off appreciably before the next rectified pulse of charging current arrives. The microammeter 22 reads the discharge current which is equal to the charging voltage divided by the ohmic value of the resistor 21. Because the discharge rate is so low, the condenser has a tendency to remain charged at the highest peak value of the complex wave. The discharge current being proportional to this peak voltage, then becomes a direct measure of the peak charging voltage.

In the instrument described, the value of resistor 21 and the full scale range of microammeter 22 are so chosen that the full scale deflection of the meter is obtained for a peak voltage input equal to the average carrier voltage established across resistor 12. The scale of the meter 22 can then be marked off in percentage and will indicate modulation degree in percentage directly.

As a practical example of the foregoing, the value of resistor 12 may be chosen as 5,000 ohms and the input potentiometer 10 is adjusted until 10 milliamperes flow through the resistor. This establishes a voltage of 50 across the resistor 12 and this is proportional to the average carrier amplitude. This steady direct current voltage will, of course, have the modulation variations superimposed upon it. The steady-state direct current voltage corresponding to the average carrier value is balanced out (as far as the analyzing circuit is concerned) with 50 volts obtained from the rectifier and filter system 15. This procedure leaves only the instantaneous modulation variations to effect the analyzer circuit. The resistor 21 is chosen at 1 megohm and the meter 22 is a 50 microampere instrument. For full scale deflection of this meter 50 volts peak is required. It follows that a full scale deflection represents a 100 per cent variation of the 50 volt steady-state carrier voltage across the resistor 12.

Figure 3:
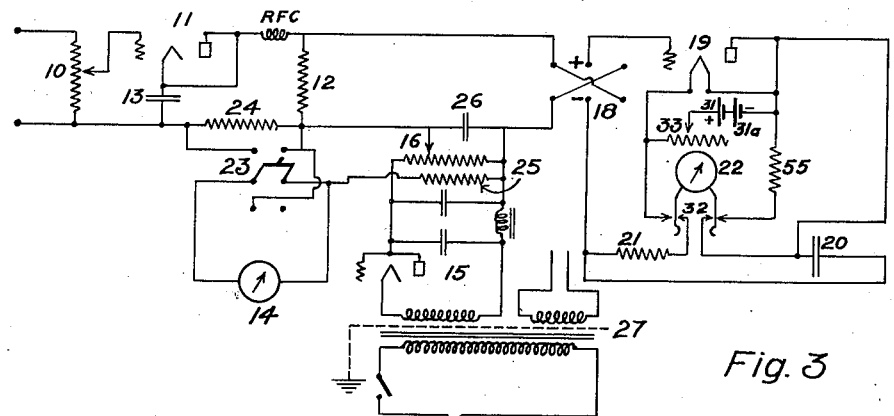
Figure 3 is a diagram of a commercial circuit and apparatus embodying the schematic circuits shown in Figure 2.

Figure 3 is a diagram of a commercial circuit and apparatus embodying the schematic circuit shown in Figure 2. Here 10 is the input potentiometer used for adjusting the incoming modulated wave to give a predetermined deflection on meter 14. Tube 11 is connected as a diode and acts in conjunction with the circuit elements, condenser 13, and resistor 12, as a linear demodulator. RFC is a radio frequency choke coil, which, with condenser 13, acts as a filter to prevent radio frequency from getting to the analyzer circuit.

By means of the meter switch 23, meter 14 is made to do double duty inasmuch as in one switch position a shunt 24 is thrown across the meter so that the meter serves as a current indicator, while in the other switch position a multiplier 25 is inserted in series with the meter to permit the measurement of the balancing potential obtained from the rectifier and filter system 15, and this eliminates meter 17 shown in Figure 1. The magnitude of this potential is controlled by potentiometer 16. The condenser 26 by-passes this potentiometer for audio frequencies. Reversing switch 18 permits the meter 22 to indicate negative or positive modulation peaks. The action of this voltmeter has been explained. An electrostatic shield 27 placed between primary and secondary windings of the power transformer prevents radio frequency picked up on the power line from getting into the instrument wiring and apparatus.

It will be observed that the change in the deflection of the meter 14 when connected so as to read the average carrier current serves as a direct indication of dissymmetry in the modulation envelope and hence its distortion. This instrument therefore serves not only as a current indicator, but also as an arbitrary distortion indicator, and may be used as such.

Figure 5:
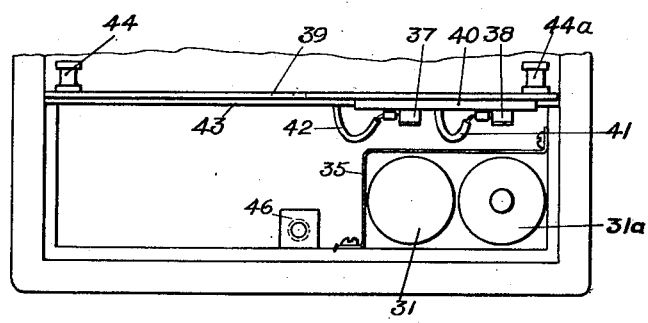
Figure 5 is a top view of the battery compartment of the meter shown in Figure 4 with the cover raised to show the connections on the under side thereof.
Figures 6, 7:
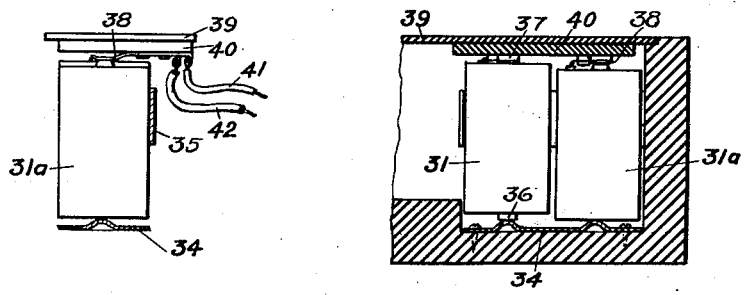
Figures 6 and 7 are detail views of the battery connections as used in the meter shown in Figure 4.

The portable instrument shown in Figures 5–7 inclusive is an essential part of the apparatus herein described not ordinarily available and may be used alone for a variety of purposes. It comprises a suitable casing 28 having a top 29 of suitable material, in which is mounted the flush type microammeter 22. As any suitable construction for the meter may be used it is not here described in detail.

Mounted upon the top 29 is a socket 30 for the tube indicated in the diagrams, Figures 2 and 3, by the numeral 19. This may be any suitable type of tube, and a suitable source of current such as the small flash light batteries 31, 31a is provided for operating the filament thereof. These battery cells are in series with the rheostat 33. A push button or switch 32 controls the resistance 55 and puts this resistance in series with meter 22 when operated so that the filament voltage of the tube is indicated on the meter when the push button or switch 32 is depressed, as it connects the meter 22 as a 5 volt D. C. instrument, and enables the filament voltage for the tube 19 to be adjusted to its proper operating value of 2 volts by means of the rheostat 33. After this adjustment has been made, the switch (of the usual push button type) 32 is released and the instrument is ready for operation as a peak voltmeter.

The casing 28 contains the condenser 20, the resistor 21 and other parts as may be necessary in connection with the analyzing circuit shown at the right of the switch 18, Figure 3, assembled in the casing 28 in a compact form, ready for use, including the filament rheostat 33, switch 32, the batteries for the tube 19 and providing space below lid 39 for a spare tube.

As these batteries require frequent renewal, special mention is made of the method of connecting the same into the casing 28 whereby the necessity for making and breaking flexible connections to the cells is avoided, particularly as such cells of the small flash light type such as the Ever Ready Type 935 are not provided with circuit terminals, and the only way to attach wires thereto is to solder them, one to the outer zinc casing and the other to the usual copper tip on the upwardly extending carbon electrode. This soldering is avoided by the arrangement shown in Figures 5, 6 and 7, in which a metal plate 34 is secured in the bottom of the casing 28, to the side of which is attached by screws or the like the bracket 35 which is insulated from the cells. The flash light cells 31, 31a are merely dropped in this bracket, 31a with the bottom of the zinc can in contact with the plate 34 and 31 with the carbon electrode 36 downwards, so that it will contact with the plate 34. The result is that the cells 31, 31a are connected in series, the plate 34 having an upwardly extending spud adapted to contact with the carbon electrode 36. The upper ends of the cells contact with the connectors 37, 38 which are secured to the lid 39 of the battery compartment. If this is of metal it is provided with a suitable insulating block 40 on which the connectors are mounted. The connectors are then connected to the flexible conductors 41, 42 which pass through a partition 43 in the casing 28 and connect the batteries in circuit with the other parts of the apparatus.

Knobs 44, 44a are provided for lifting out the panel 39 and a screw knob 45 passing through this panel, engages the threaded bracket 46 mounted on a side wall of the casing, thereby securing the panel 39 in place.

Figure 4:
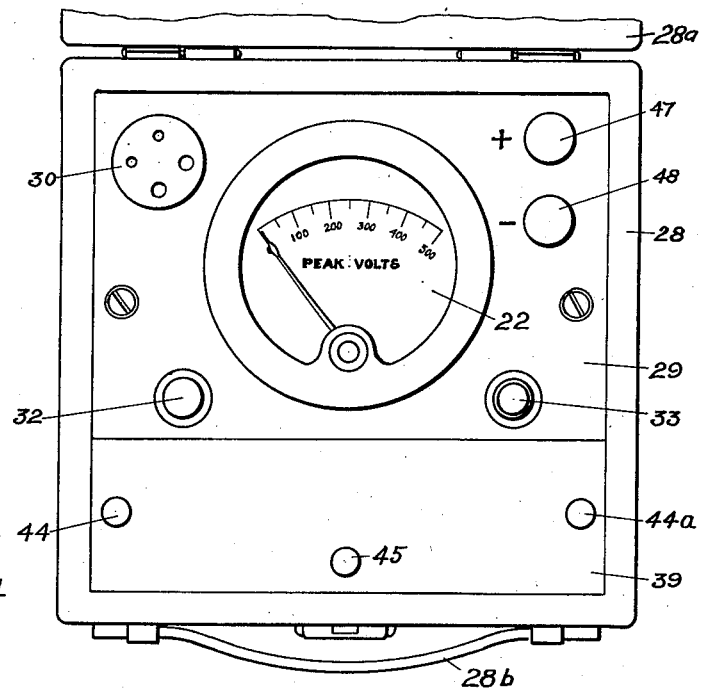
Figure 4 is a plan view of a meter assembly used in the circuit, Figure 3.

A suitable top 28a covers the instrument shown in Figure 4, said top enclosing not only the instrument and other parts mounted on the top 29, but also the top 39 of the battery compartment, so that the meter 22 with its associated equipment as described including the batteries, may consist of a box approximately 6" x 7" square and 3¾" deep, which may be provided with the usual handle 28b and in outward appearance resembles an ordinary portable meter thereby affording a compact, efficient instrument, light in weight and adapted to be readily carried from place to place, the same being instantly ready for use by connecting the reversing switch 18 to the binding posts 47, 48. When measuring D. C. potentials the polarity indicated on these binding posts should be used.

With an instrument such as just described, the input impedance varies from 1,000,000 ohms at zero frequency to 1,350 ohms at 10 megocycles per second, and the instrument is therefore adapted to cover a wide range of commercial measurements with an accuracy of approximately 2%, which for such measurements is a permissible error.

From the foregoing description of this method and the apparatus used therewith, it will be seen that by this method one of the two components of a rectified modulated carrier wave is measured by the meter 22 while the same is made insensitive to the other component. The two products of the rectification of a complex wave such as a modulated carrier are (a) a direct current proportionate to the average value of the wave; (b) the alternating component directly proportional to the instantaneous value of the complex modulating wave. It is the ratio of these two components at any instant that determines the degree of modulation which the meter 22 measures. This modulation degree may be defined as the ratio of the increase of the amplitude of the carrier wave during modulation, to the steady-state amplitude of that carrier wave with no modulation, the meter measuring the peak amplitude of the A. C. component.

Figure 8:
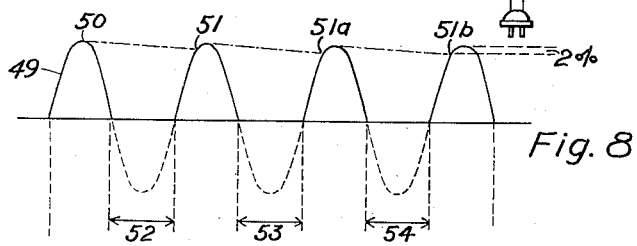
Figure 8 is a diagram illustrating the importance of the time constant in affecting the operation of the meter portion only of the circuit.

The time constant, which is the product of the resistance in ohms of the resistor 21 and the capacity in farads of the condenser 20 (i. e, R. C.), must be such that the condenser will not discharge appreciably during the non-charging half cycle of the rectified alternating current wave for the lowest frequency which it is desired to measure. This will be evident from Figure 8 in which is shown a voltage curve 49 of which it is desired to measure the peak voltage within 2%.

Assuming that the time constant of the measuring circuit were such that the voltage measurements could be taken exactly on the peak at the point 50, the absolute peak voltage would be obtainable. This is practically impossible and the measurements made are as if taken at the points indicated at 51, 51a, 51b of each half cycle. The time constant of the measuring circuit is adjusted to make these points as near the peak point 50 as possible and must also allow for the non-charging half cycles 52, 53 and 54, etc.

Accepting 2% as the permissible commercial deviation from peak value indication, the following condition must be satisfied $$RC = \frac{25}{f}$$

Where
R=Resistance in discharge circuit in ohms
C=Capacitance in farads
$f$=The minimum frequency in cycles per second at which the above acccuracy must be maintained.

This formula is obtained by considering that the time available for discharge is equal to the time required for a half cycle of the alternating current wave. If during this half cycle, the discharge is to be so limited that the indication is within 2% of the peak value, then the discharge rate must be such that the time of one half cycle of the wave is equal to 2% of the time constant of the discharge circuit.

$$RC(.02) = \frac{1}{2f} \text{ seconds}$$

$$RC = \frac{100}{.04f} = \frac{25}{f} \text{ seconds}$$

In a capacity circuit
$q$=Ce
Where
$q$=charge in coulombs (amperes × seconds)
$e$=voltage
C=capacitance in farads.

In the given circuit, if 2% of charge is the permissible drop during the idle half cycle, this drop=$q' = .02q = .02Ce$.

Transposing, $$C = \frac{q'}{.02e}$$

Since $q'$=amperes × seconds
and $e$=voltage $$C = \frac{\text{amperes} \times \text{seconds}}{.02 \text{ voltage}} = \frac{\text{amperage} \times T}{.02 \text{ voltage}}$$

The time constant of a capacity circuit=RC
where R=the resistance
C=capacitance $$R = \text{resistance} = \frac{\text{voltage}}{\text{amperage}}$$

In the above circuit, $$RC = \left(\frac{\text{voltage}}{\text{amperage}}\right) \times \left(\frac{\text{amperage} \times T}{.02 \text{ voltage}}\right) = \frac{T}{.02}$$

T is the time of ½ cycle,
or $$\frac{1}{2}\left(\frac{1}{\text{frequency}}\right) = \frac{1}{2f} \text{ seconds}$$

$$\therefore RC = \frac{\frac{1}{2f}}{.02} = \frac{1}{.04f} = \frac{25}{F} \text{ seconds for the required circuit}$$

Although the invention has been disclosed in connection with the specific details of preferred embodiments thereof, it must be understood that such details are not intended to be limitative of the invention except in so far as set forth in the accompanying claims.

What is claimed is:

1. The herein described method of measuring the peak voltage of a modulated carrier wave which consists of providing an input circuit containing resistance, rectifying said current in said circuit, establishing a voltage by means of said current across said resistance, introducing a balancing voltage into said circuit equal in magnitude and of opposite polarity to the voltage across said resistance, rectifying the net output of said circuit and charging a capacity therewith, and measuring the discharge current from said capacity.

2. The herein described method of determining by voltage measurements the amplitude variation of a modulated carrier wave which consists of demodulating said wave, introducing a balancing voltage equal to the average carrier voltage established at a predetermined point in the circuit, rectifying the remaining component of the demodulated wave after the steady-state component has been balanced out, developing a potential in accordance with said rectified remaining component, discharging said developed potential and measuring said discharge current directly in terms of percentage modulation.

3. The method of measuring percentage of modulation which consists of demodulating a modulated carrier wave, establishing a known voltage at a point in a circuit carrying said demodulated wave, balancing out the average carrier amplitude component of said wave by imposing thereon a balancing voltage equal in magnitude and opposite in polarity thereto, connecting the remaining component representing the modulation of said wave to a capacity to charge the same, and directly measuring the discharge from said capacity by means indicating the percentage of modulation as compared with the known voltage established in the circuit as aforesaid.

4. A modulation metering system comprising a circuit including means for demodulating a modulated carrier wave, means in said circuit for establishing a known voltage directly proportional to the average voltage of said carrier, means for introducing in series with the demodulated voltage a balancing voltage equal in magnitude and opposite in polarity thereto, a condenser connected to said demodulated and balanced voltage, and a meter directly connected to said condenser adapted to read the discharge therefrom.

5. Apparatus for measuring the voltages of the components of a modulated alternating current wave comprising means to demodulate a component of said wave, means to directly determine the average voltage of said wave, means for impressing on said demodulated wave a known voltage equal in magnitude and opposite in polarity to one of the components thereof, in order to suppress same, means including a condenser adapted to be charged by an unsuppressed component of said wave, and means for measuring the discharge current of said condenser whereby the value of said last component may be determined and compared as a percentage of said first voltage determination.

WORTHINGTON C. LENT.